United States Patent [19]
Wamsley

[11] Patent Number: 5,954,014
[45] Date of Patent: Sep. 21, 1999

[54] SLIP COVERS FOR PET CARRIERS

[76] Inventor: Linda S Wamsley, 487 Winters La., Cold Springs, Ky. 41076

[21] Appl. No.: 08/974,845

[22] Filed: Nov. 20, 1997

Related U.S. Application Data

[63] Continuation-in-part of application No. 29/060,911, Oct. 10, 1996, abandoned.

[51] Int. Cl.[6] .................................................. A01K 29/00
[52] U.S. Cl. ........................... 119/497; 119/470; 150/105
[58] Field of Search .................................. 119/497, 452, 119/453, 459, 461, 491, 484, 469, 470, 482, 489, 496, 498; 150/164, 105, 113, 158, 165

[56] References Cited

U.S. PATENT DOCUMENTS

| | | | |
|---|---|---|---|
| 1,015,766 | 1/1912 | Stone | 119/470 |
| 3,335,775 | 8/1967 | Adams | 150/30 |
| 4,947,794 | 8/1990 | Baldwin | 119/470 |
| 5,230,304 | 7/1993 | Santoro | 119/497 X |

*Primary Examiner*—Jack W. Lavinder
*Assistant Examiner*—Yvonne R. Abbott

[57] ABSTRACT

A new slip cover for a pet carrier for helping prevent drafts while transporting an animal within a pet carrier. The inventive device includes a cover member having a top panel with front, back, and a pair of spaced apart side panels downwardly depending from the outer perimeter of the top panel. The front panel is spaced apart from the back panel with the side panels extending between the front and back panels to form an interior cavity. The front, back, and side panels each have a top region and a bottom edge which together define a lower opening into the interior cavity for permitting insertion of a pet carrier into the interior cavity. The front panel has a cutout extending from the bottom edge of the front panel towards the top region of front panel for providing a front opening into the interior cavity. The top edge of a cover flap is pivotally coupled to the top region of the front panel so that the cover flap is positionable adjacent the outer surface of the front panel such that the cover flap substantially covers the cutout of the front panel. The top panel also includes a slot that opens into the interior cavity for permitting insertion of a handle of a pet carrier therethrough.

10 Claims, 3 Drawing Sheets

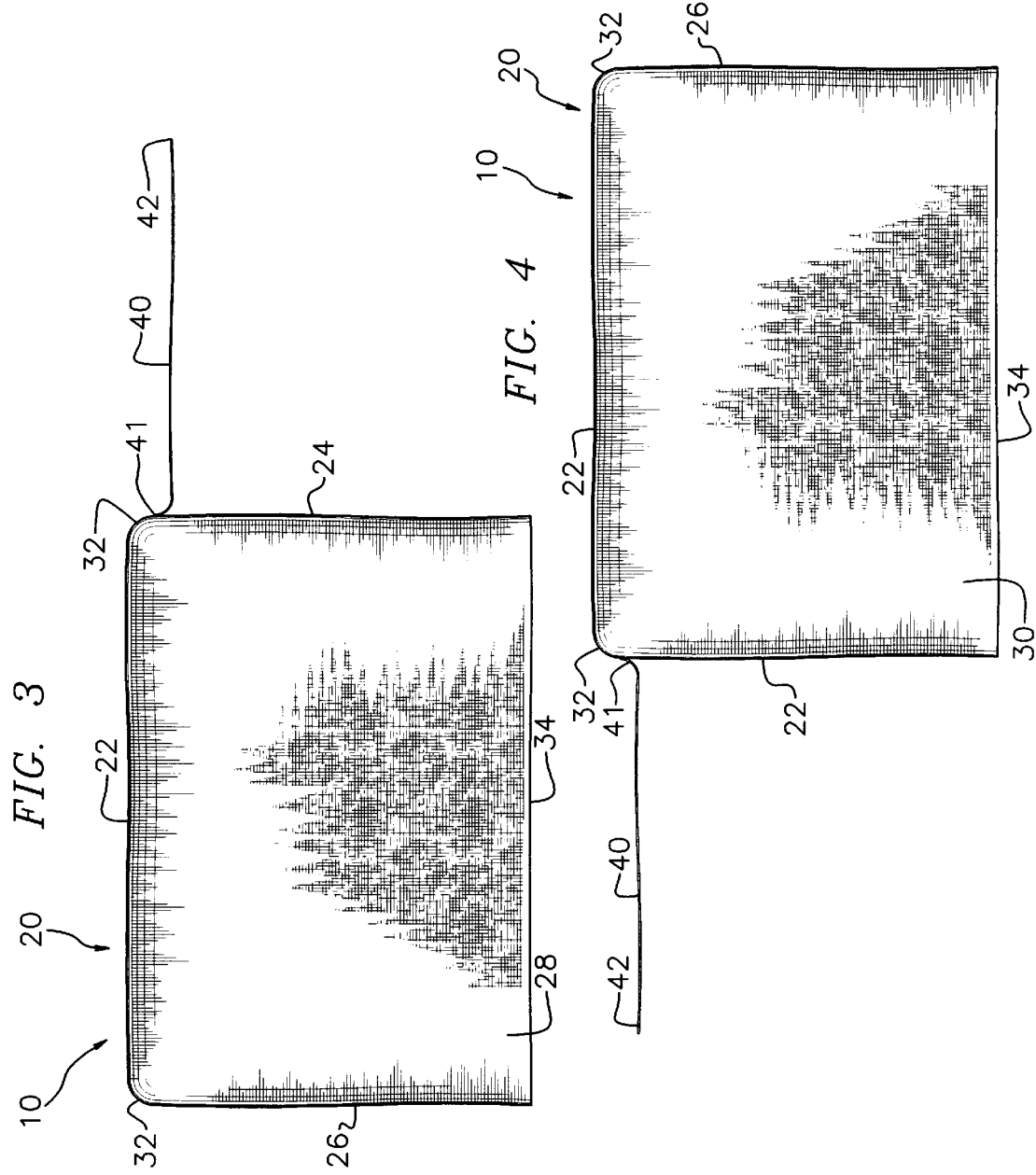

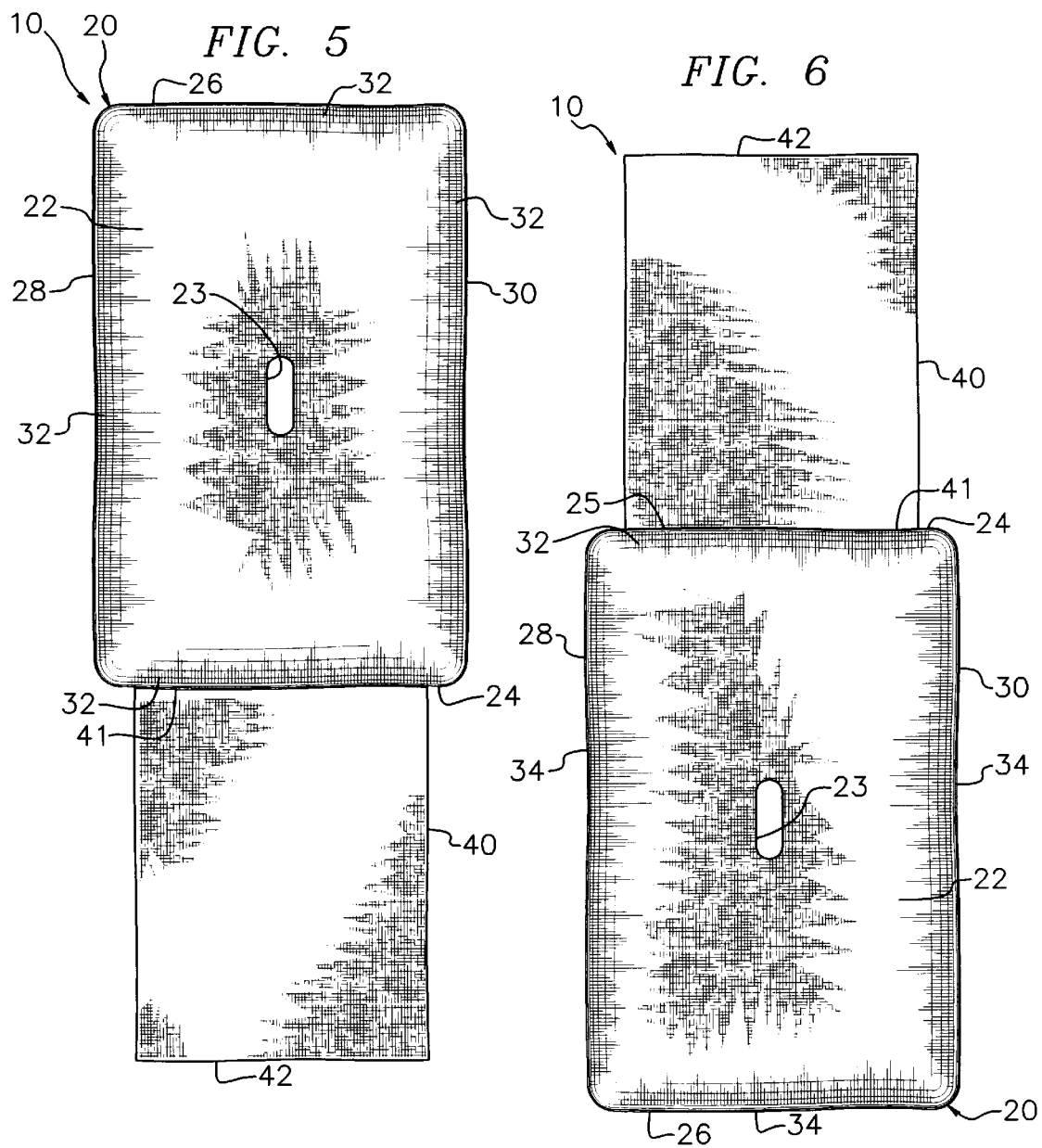

SLIP COVERS FOR PET CARRIERS

CROSS REFERENCE TO RELATED APPLICATION

This application is a continuation-in-part of my prior design U.S. patent application Ser. No. 29/060,911, now abandoned filed Oct. 10, 1996.

BACKGROUND OF THE INVENTION

1. Field of the Invention

The present invention relates to slip covers for pet carriers and more particularly pertains to a new slip cover for a pet carrier for helping prevent drafts while transporting an animal within a pet carrier.

2. Description of the Prior Art

The use of slip covers for pet carriers is known in the prior art. More specifically, slip covers for pet carriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art slip covers for pet carriers include U.S. Pat. No. 5,113,793; U.S. Pat. No. 4,803,951; U.S. Pat. No. 4,947,794; U.S. Pat. No. 4,745,769; U.S. Pat. No. 5,072,694; U.S. Pat. No. Des. 312,514; U.S. Pat. No. Des. 366,543; U.S. Pat. No. 4,683,839; U.S. Pat. No. 4,729,343; U.S. Pat. No. 4,819,580; U.S. Pat. No. 4,858,561; U.S. Pat. No. 5,148,774; U.S. Pat. No. 5,188,063; U.S. Pat. No. 5,220,885; U.S. Pat. No. 5,485,805; E.P. Pat. No. EP 372,659; and W.O. Pat. No. WO 9,007,269.

While these devices fulfill their respective, particular objectives and requirements, the aforementioned patents do not disclose a new slip cover for a pet carrier. The inventive device includes a cover member having a top panel with front, back, and a pair of spaced apart side panels downwardly depending from the outer perimeter of the top panel. The front panel is spaced apart from the back panel with the side panels extending between the front and back panels to form an interior cavity. The front, back, and side panels each have a top region and a bottom edge which together define a lower opening into the interior cavity for permitting insertion of a pet carrier into the interior cavity. The front panel has a cutout extending from the bottom edge of the front panel towards the top region of front panel for providing a front opening into the interior cavity. The top edge of a cover flap is pivotally coupled to the top region of the front panel so that the cover flap is positionable adjacent the outer surface of the front panel such that the cover flap substantially covers the cutout of the front panel. The top panel also includes a slot that opens into the interior cavity for permitting insertion of a handle of a pet carrier therethrough.

In these respects, the slip cover for a pet carrier according to the present invention substantially departs from the conventional concepts and designs of the prior art, and in so doing provides an apparatus primarily developed for the purpose of helping prevent drafts while transporting an animal within a pet carrier.

SUMMARY OF THE INVENTION

In view of the foregoing disadvantages inherent in the known types of slip covers for pet carriers now present in the prior art, the present invention provides a new slip cover for a pet carrier construction wherein the same can be utilized for helping prevent drafts while transporting an animal within a pet carrier.

The general purpose of the present invention, which will be described subsequently in greater detail, is to provide a new slip cover for a pet carrier apparatus and method which has many of the advantages of the slip covers for pet carriers mentioned heretofore and many novel features that result in a new slip cover for a pet carrier which is not anticipated, rendered obvious, suggested, or even implied by any of the prior art slip covers for pet carriers, either alone or in any combination thereof.

To attain this, the present invention generally comprises a cover member having a top panel with front, back, and a pair of spaced apart side panels downwardly depending from the outer perimeter of the top panel. The front panel is spaced apart from the back panel with the side panels extending between the front and back panels to form an interior cavity. The front, back, and side panels each have a top region and a bottom edge which together define a lower opening into the interior cavity for permitting insertion of a pet carrier into the interior cavity. The front panel has a cutout extending from the bottom edge of the front panel towards the top region of front panel for providing a front opening into the interior cavity. The top edge of a cover flap is pivotally coupled to the top region of the front panel so that the cover flap is positionable adjacent the outer surface of the front panel such that the cover flap substantially covers the cutout of the front panel. The top panel also includes a slot that opens into the interior cavity for permitting insertion of a handle of a pet carrier therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new slip cover for a pet carrier apparatus and method which has many of the advantages of the slip covers for pet carriers mentioned heretofore and many novel features that result in a new slip cover for a pet carrier which is not anticipated, rendered obvious, suggested, or even implied by any of the prior art slip covers for pet carriers, either alone or in any combination thereof.

It is another object of the present invention to provide a new slip cover for a pet carrier which may be easily and efficiently manufactured and marketed.

It is a further object of the present invention to provide a new slip cover for a pet carrier which is of a durable and reliable construction.

An even further object of the present invention is to provide a new slip cover for a pet carrier which is susceptible of a low cost of manufacture with regard to both materials and labor, and which accordingly is then susceptible of low prices of sale to the consuming public, thereby making such slip cover for a pet carrier economically available to the buying public.

Still yet another object of the present invention is to provide a new slip cover for a pet carrier which provides in the apparatuses and methods of the prior art some of the advantages thereof, while simultaneously overcoming some of the disadvantages normally associated therewith.

Still another object of the present invention is to provide a new slip cover for a pet carrier for helping prevent drafts while transporting an animal within a pet carrier.

Yet another object of the present invention is to provide a new slip cover for a pet carrier which includes a cover member having a top panel with front, back, and a pair of spaced apart side panels downwardly depending from the outer perimeter of the top panel. The front panel is spaced apart from the back panel with the side panels extending between the front and back panels to form an interior cavity. The front, back, and side panels each have a top region and a bottom edge which together define a lower opening into the interior cavity for permitting insertion of a pet carrier into the interior cavity. The front panel has a cutout extending from the bottom edge of the front panel towards the top region of front panel for providing a front opening into the interior cavity. The top edge of a cover flap is pivotally coupled to the top region of the front panel so that the cover flap is positionable adjacent the outer surface of the front panel such that the cover flap substantially covers the cutout of the front panel. The top panel also includes a slot that opens into the interior cavity for permitting insertion of a handle of a pet carrier therethrough.

Still yet another object of the present invention is to provide a new slip cover for a pet carrier that helps reduce the stress and trauma on an animal within a pet carrier while transporting the animal, especially while driving in a vehicle by covering most openings in the pet carrier.

Even still another object of the present invention is to provide a new slip cover for a pet carrier that is resistant to water passing through it and into the pet carrier so that an animal within the pet carrier may stay dry when being transported when it is raining.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic left side view of the present invention.

FIG. 4 is a schematic right side view of the present invention.

FIG. 5 is a schematic top side view of the present invention.

FIG. 6 is a schematic bottom side view of the present invention.

DESCRIPTION OF THE PREFERRED EMBODIMENT

Figure 1:
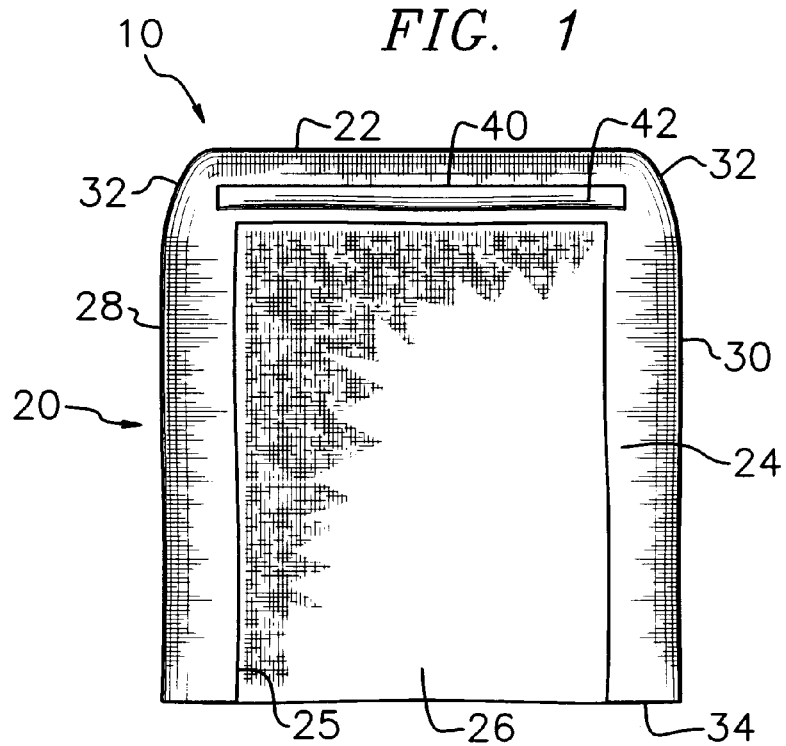
FIG. 1 is a schematic front side view of a new slip cover for a pet carrier according to the present invention.
Figure 2:
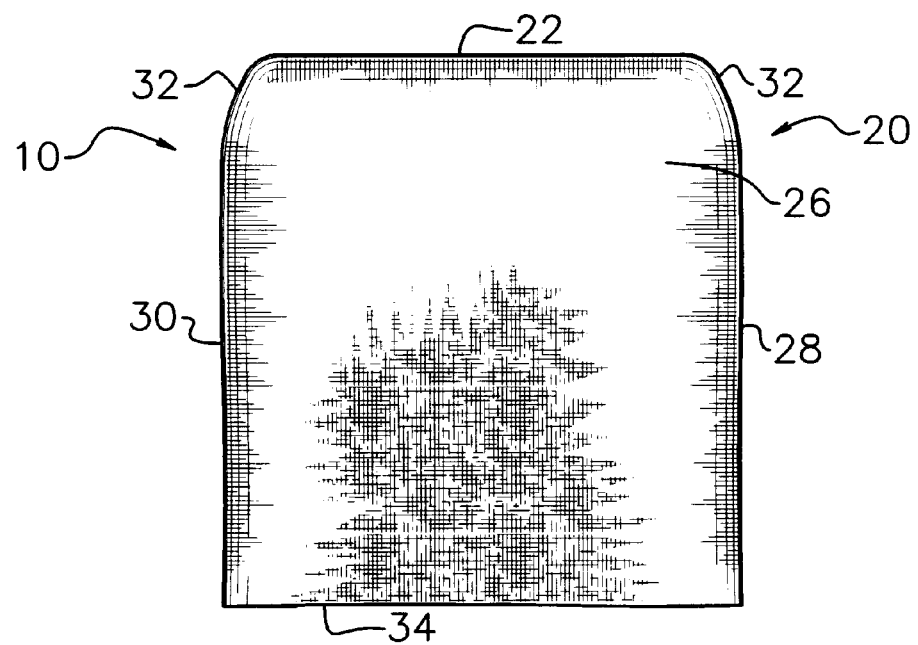
FIG. 2 is a schematic back side view of the present invention.

With reference now to the drawings, and in particular to FIGS. 1 through 6 thereof, a new slip cover for a pet carrier embodying the principles and concepts of the present invention and generally designated by the reference numeral 10 will be described.

In use, the slip cover 10 is designed for covering a commonly available rectangular pet carriers used to conveniently transport a pet. As best illustrated in FIGS. 1 through 6, the slip cover for a pet carrier 10 generally comprises a cover member 20 having a top panel 22 with front, back, and a pair of spaced apart side panels 24,26,28,30 downwardly depending from the outer perimeter of the top panel 22. The front panel 24 is spaced apart from the back panel 26 with the side panels 28,30 extending between the front and back panels 24,26 to form an interior cavity. The front, back, and side panels 24,26,28,30 each have a top region 32 and a bottom edge 34 which together define a lower opening into the interior cavity for permitting insertion of a pet carrier into the interior cavity. The front panel 24 has a cutout 25 extending from the bottom edge 34 of the front panel 24 towards the top region 32 of front panel 24 for providing a front opening into the interior cavity. The top edge 41 of a cover flap 40 is pivotally coupled to the top region 34 of the front panel 24 so that the cover flap 40 is positionable adjacent the outer surface of the front panel 24 such that the cover flap 40 substantially covers the cutout 25 of the front panel 24. The top panel 22 also includes a slot 23 that opens into the interior cavity for permitting insertion of a handle of a pet carrier therethrough.

Preferably, the cover member is flexible with the top, front, back, and side panels 22,24,26,28,30, and the cover flap 40 all being flexible to permit collapsing of the cover member 20 for convenient storage of the slip cover when not in use covering a pet carrier. In the preferred embodiment, the top, front, back, and side panels and the cover flap are constructed to be resistant to water and other fluids passing therethrough into the interior cavity of the cover member 20 so that the slip cover 10 helps keep a pet carrier within the interior cavity dry during rainy weather. Ideally, the panels of the cover member 20 and the cover flap are constructed from a flexible (ideally woven) fabric material which is breathable to permit air to pass therethrough to provide ventilation to the interior cavity.

With reference to the figures, the cover member 20 and its panels 22,24,26,28,30 are preferably generally rectangular in shape. In this preferred embodiment, the cutout 25 through the front panel 24 is also generally rectangular with the cover flap 40 being generally rectangular to cover the cutout.

As illustrated in FIGS. 5 and 6, the top panel 22 has a slot 23 opening into the interior cavity of the cover member 20 for permitting insertion of a top carrying handle of a pet carrier within the interior cavity. Preferably, the slot 23 is centrally positioned on the top panel 22 for proper insertion of the handle of a pet carrier therethrough. Ideally, the slot 23 is generally an elongate oblong with its length being extended substantially parallel with the side panels 28,30.

With reference to FIGS. 1,2,3, and 4, the front, back, and side panels 24,26,28,30 all downwardly depend from the outer perimeter of the top panel 22. As shown in FIG. 6, the front panel 24 is spaced apart from the back panel 26 with the side panels 28,30 extending between the front and back panels 24,26 to form an interior cavity which is preferably shaped for receiving a generally rectangular pet carrier therein. Each of these panels 24,26,28,30 includes a top region 32 and a bottom edge 34. The bottom edges 34 of the front, back, and side panels 24,26,28,30 together define the lower opening (as seen in FIG. 6) into the interior cavity which permits insertion of a pet carrier therethrough into the interior cavity. Ideally, as seen in FIGS. 1,2,3, and 4, the top regions 32 of the front, back, and side panels 24,26,28,30 curve towards the outer perimeter of the top panel 22 to aiding proper fitting of a typical pet carrier within the interior cavity.

As illustrated in FIG. 1, the cutout 25 through the front panel 24 extends from the bottom edge 34 of the front panel towards the top region 32 of front panel 24. The cutout 25 provides a front opening into the interior cavity for permitting easy access to a frontal door opening of a pet carrier. This permits access of the frontal opening of the pet carrier without having to remove the slip cover 10 from over the pet carrier.

With reference to FIGS. 1,3 and 4, the top edge 41 of the cover flap 40 is pivotally coupled to the top region 32 of the front panel 24. The cover flap 40 is positionable adjacent the outer surface of the front panel 24 such that the cover flap 40 substantially covers the cutout 25. Preferably, the bottom edge 42 of the cover flap 40 is positionable adjacent and substantially parallel with the bottom edge 34 of the front flap 24 when the cover flap 40 is positioned adjacent the outer surface of the front panel 24.

In use, the cover member 20 is slipped over the top of a pet carrier so that the pet carrier is inserted through the lower opening into the interior cavity of the cover member 20. Preferably, the pet carrier should be inserted into the interior cavity such that the frontal door opening in the pet carrier is positioned towards the cutout 25 in the front panel 24. The cover flap 40 may be positioned to cover the cutout 25 so that the upper portions of the pet carrier (including the frontal door opening) are substantially covered by the slip cover 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A protective cover for a pet carrier of the type having an interior and a door opening for permitting access to the interior of the pet carrier, said pet carrier further comprising a handle pivotally mounted to a top wall of said pet carrier, said handle being elongated for gripping by a hand of a user, said cover comprising:

a cover member being having a top panel, a front panel, a back panel, and a pair of spaced apart side panels;

said top panel having an outer perimeter, said front, back, and side panels downwardly depending from said outer perimeter of said top panel, said front panel being spaced apart from said back panel, said side panels being extended between said front and back panels, said front, back, and side panels forming an interior cavity;

said front, back, and side panels each having a top region and a bottom edge, said bottom edges of said front, back, and side panels defining a lower opening into said interior cavity for permitting insertion of a pet carrier therethrough into said interior cavity;

said front panel having a outer surface;

said top panel having a slot opening into said interior cavity for permitting insertion of an elongate handle of a pet carrier therethrough, wherein said slot has a generally elongate oblong shape for permitting the hand of the user to reach through the slot and grasp the handle for pulling said handle through said slot upon placement of said cover member over said pet carrier;

said front panel having a cutout extending from said bottom edge of said front panel towards said top region of said front panel, said cutout providing a front opening into said interior cavity, said cutout having a width dimension extending in a direction substantially parallel to said bottom edge of said front panel;

a cover flap having top and bottom edges, said top edge of said cover flap being pivotally coupled to said top region of said front panel, said cover flap having a width dimension extending in a direction substantially parallel to said bottom edge of said cover flap; and said cover flap being positionable adjacent said outer surface of said front panel such that said cover flap substantially covers said cutout of said front panel, wherein the width dimension of said cover flap is greater than the width dimension of said cutout such that said cover flap overlaps said cutout for blocking movement of precipitation between said cover flap and said cutout of said front panel when said cover flap is positioned adjacent to said outer surface of said front panel.

2. The protective cover of claim 1, wherein said cover member is generally rectangular, wherein said top, front, back and side panels are generally rectangular, wherein said cutout is generally rectangular, and wherein said cover flap is generally rectangular.

3. The protective cover of claim 1, wherein said top regions of said front, back, and side panels curve towards said outer perimeter of said top panel.

4. The protective cover of claim 1, wherein said slot is centrally positioned on said top panel.

5. The protective cover of claim 1, wherein the length of said slot extends substantially parallel to said side panels.

6. The protective cover of claim 1, wherein said bottom edge of said cover flap is positionable adjacent said bottom edge of said front flap when said cover flap is positioned adjacent said outer surface of said front panel.

7. The protective cover of claim 1, wherein said top, front, back, and side panels, and said cover flap are flexible to permit collapsing of said cover member for storage when said cover member is not in use.

8. The protective cover of claim 1, wherein said top, front, back, and side panels, and said cover flap are resistant to water passing therethrough.

9. The protective cover of claim 1, wherein said top, front, back, and side panels, and said cover flap comprise a flexible fabric material, wherein said fabric material permits air to pass therethrough.

10. A protective cover for covering a generally rectangular pet carrier of the type having an interior and a door opening for permitting access to the interior of the pet carrier, said pet carrier further comprising a handle pivotally mounted to a top wall of said pet carrier, said handle being elongated for gripping by a hand of a user, said protective cover comprising:

a flexible cover member being generally rectangular and having a generally rectangular top panel, a generally rectangular front panel, a generally rectangular back panel, and a pair of spaced apart generally rectangular side panels;

said top panel having an outer perimeter, said front, back, and side panels downwardly depending from said outer perimeter of said top panel, said front panel being spaced apart from said back panel, said side panels being extended between said front and back panels, said front, back, and side panels forming an interior cavity;

said front, back, and side panels each having a top region and a bottom edge, said bottom edges of said front, back, and side panels defining a lower opening into said interior cavity for permitting insertion of a pet carrier therethrough into said interior cavity;

said top regions of said front, back, and side panels curving towards said outer perimeter of said top panel;

said front panel having a outer surface;

said top panel having a slot opening into said interior cavity for permitting insertion of an elongate handle of a pet carrier therethrough, said slot being centrally positioned on said top panel, wherein the length of said slot being extended substantially parallel with said side panels, wherein said slot has a generally elongate oblong shape for permitting the hand of the user to reach through the slot and grasp the handle for pulling said handle through said slot upon placement of said cover member over said pet carrier;

said front panel having a generally rectangular cutout extending from said bottom edge of said front panel towards said top region of front panel, said cutout providing a front opening into said interior cavity, said cutout having a width dimension extending in a direction substantially parallel to said bottom edge of said front panel;

a generally rectangular cover flap having top and bottom edges, said top edge of said cover flap being pivotally coupled to said top region of said front panel, said cover flap having a width dimension extending in a direction substantially parallel to said bottom edge of said cover flap;

said cover flap being positionable adjacent said outer surface of said front panel such that said cover flap substantially covers said cutout of said front panel, said bottom edge of said cover flap being positionable adjacent said bottom edge of said front flap when said cover flap is positioned adjacent said outer surface of said front panel to substantially cover said cutout of said front panel, wherein the width dimension of said cover flap is greater than the width dimension of said cutout such that said cover flap overlaps said cutout for blocking movement of precipitation between said cover flap and said cutout of said front panel when said cover flap is positioned adjacent to said outer surface of said front panel;

wherein said top, front, back, and side panels, and said cover flap are flexible to permit collapsing of said cover member;

wherein said top, front, back, and side panels, and said cover flap are resistant to water passing therethrough; and wherein said top, front, back, and side panels, and said cover flap comprise a flexible fabric material, wherein said fabric material permits air to pass therethrough.

\* \* \* \* \*